US012809920B2

(12) United States Patent
Zheng et al.

(10) Patent No.: US 12,809,920 B2
(45) Date of Patent: *Nov. 24, 2026

(54) SYSTEMS AND METHODS FOR QUERY ENGINE ANALYSIS

(71) Applicant: Walmart Apollo, LLC, Bentonville, AR (US)

(72) Inventors: Junchao Zheng, Jersey City, NJ (US); Vishal Kumar Rathi, Kearny, NJ (US); Andrew Thomas Catalano, Kingston, NY (US); Sanjay Shah, Elizabeth, NJ (US); Aniket Ashok Limaye, Secaucus, NJ (US); Jun Zhao, Jersey City, NJ (US); Zheng Yan, Short Hills, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 206 days.

This patent is subject to a terminal disclaimer.

(21) Appl. No.: 18/755,980

(22) Filed: Jun. 27, 2024

(65) Prior Publication Data

US 2024/0346081 A1 Oct. 17, 2024

Related U.S. Application Data

(63) Continuation of application No. 17/576,720, filed on Jan. 14, 2022, now Pat. No. 12,038,975.

(51) Int. Cl.

*G06F 16/00* (2019.01)
*G06F 16/2457* (2019.01)
*G06F 16/9032* (2019.01)

(52) U.S. Cl.

CPC .................. *G06F 16/90328* (2019.01); *G06F 16/24578* (2019.01)

(58) Field of Classification Search

CPC ......... G06F 16/90328; G06F 16/24578; G06F 16/9535; G06F 16/3322

(Continued)

(56) References Cited

U.S. PATENT DOCUMENTS 9,405,841 B2 * 8/2016 Amacker ............ G06F 16/3323
12,038,975 B2 * 7/2024 Zheng ............... G06F 16/24578

(Continued)

*Primary Examiner* — Noosha Arjomandi

(74) *Attorney, Agent, or Firm* — FOLEY & LARDNER LLP

(57) ABSTRACT

A method includes coordinating at a first system in an online mode: analyzing at least a portion of a search query using one or more query suggestion systems to determine scores for suggested search queries from the one or more query suggestion systems. The method also includes coordinating at a second system in the online mode: determining position metrics for the suggested search queries, wherein the position metrics are based on the scores for the suggested search queries; determining efficiency metrics for the one or more query suggestion systems based on the position metrics for the one or more query suggestion systems; analyzing the efficiency metrics for the one or more query suggestion systems to determine a query suggestion system of the one or more query suggestion systems that satisfies a threshold; and transmitting instructions to modify a graphical user interface (GUI) of a user device to display, to a user, one or more suggested search queries from the query suggestion system that is determined to satisfy the threshold. Other embodiments are disclosed.

20 Claims, 6 Drawing Sheets

(58) Field of Classification Search
USPC .......................................................... 707/727
See application file for complete search history.

(56) References Cited

U.S. PATENT DOCUMENTS

| | | | | |
|---|---|---|---|---|
| 12,093,979 | B2 * | 9/2024 | Arora | G06Q 30/0253 |
| 2013/0041878 | A1 * | 2/2013 | Satyanarayana | G06F 16/3322 707/706 |
| 2014/0108445 | A1 * | 4/2014 | Oztekin | G06F 16/90324 707/767 |
| 2016/0140125 | A1 * | 5/2016 | Goyal | G06N 20/00 707/751 |
| 2016/0246805 | A1 * | 8/2016 | Long | G06F 16/90324 |
| 2017/0329462 | A1 * | 11/2017 | Maheshwari | G06F 16/2474 |
| 2019/0279281 | A1 * | 9/2019 | Kumar | G06Q 30/0631 |
| 2021/0286851 | A1 * | 9/2021 | Kota | G06N 3/0455 |
| 2022/0198779 | A1 * | 6/2022 | Saraee | G06F 16/9535 |
| 2023/0229706 | A1 * | 7/2023 | Zheng | G06F 16/9535 707/727 |

* cited by examiner

500

600

602 604

| Prefix | TypeAhead Suggestions |
|---|---|
| t | ['terra and sky plus size', 'time and tru tops', 'tank tops for women', 'toilet paper', 'trampoline', 'tent', 'trash bags', 'tide laundry detergent'] |
| th | ['theme by ariella', 'thigh high stockings plus size', 'the get', 'throw pillows', 'thyme and table', 'throw blanket', 'thermometer for adults', 'the happy planner'] |
| the | ['theme by ariella', 'the get', 'theme', 'thermometer for adults', 'the happy planner', 'the ordinary skin care', 'the pioneer woman', 'thermos'] |
| the l | ['the little mermaid clothes', 'the little mermaid', 'the little mermaid swimming suit', 'the last of us 2', 'the lip bar', 'the last of us', 'the last thing he told me', 'the legend of zelda: breath of the wild - nintendo switch'] |
| the li | ['the little mermaid clothes', 'the little mermaid', 'the little mermaid swimming suit', 'the lip bar', 'the lion king dvd', 'the lion king', 'the little mermaid party supplies', 'the little things dvd'] |

606

FIG. 6

SYSTEMS AND METHODS FOR QUERY ENGINE ANALYSIS

CROSS-REFERENCE TO RELATED APPLICATIONS

This application is a continuation of U.S. patent application Ser. No. 17/576,720, filed Jan. 14, 2022. U.S. patent application Ser. No. 17/576,720 is incorporated herein by reference in its entirety.

TECHNICAL FIELD

This disclosure relates generally to computing system management, and more particularly to systems and methods for query engine analysis.

BACKGROUND

Search engines are an integral part of most computing systems. Typically, a user inputs a query into a search engine and receives a number of results. However, these results may not be what the user was looking for. This results in the user inputting additional queries that can burden the computing system and frustrate the user. In some embodiments, a query suggestion system can be employed to provide suggested queries to the user. However, the results of the query suggestion system may further frustrate the user and/or reduce an efficiency of the computing system.

BRIEF DESCRIPTION OF THE DRAWINGS

To facilitate further description of the embodiments, the following drawings are provided in which:

FIG. 6 illustrates an exemplary data relationship, according to certain embodiments.

Figure 1:
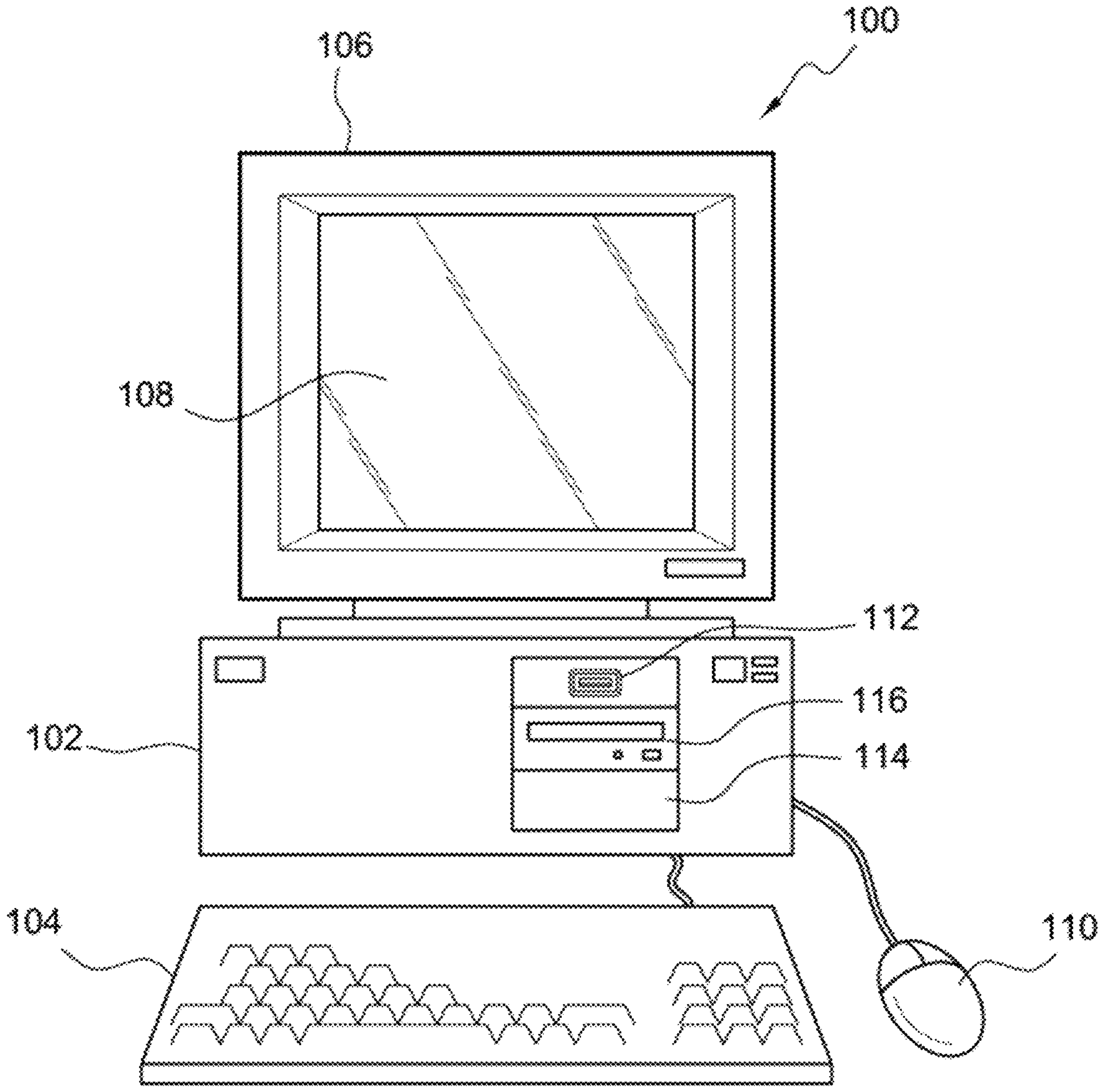
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving historical in-session user activity information; receiving, via a graphical user interface (GUI) of a user device, a partial search query from a user; analyzing the partial search query based on the historical in-session user activity information using one or more query suggestion systems to determine a respective score for respective suggested search queries from each of the one or more query suggestion systems; determining a respective absolute position metric for the respective suggested search queries from each of the one or more query suggestion systems, wherein the respective absolute position metric is based on a respective score for the respective suggested search queries; determining a respective efficiency metric for each of the one or more query suggestion systems based on the respective absolute position metric; analyzing the respective efficiency metric for each of the one or more query suggestion systems to determine a query suggestion system of the one or more query suggestion systems that satisfies a threshold; and transmitting instructions to modify the GUI to display the respective suggested search queries from the query suggestion system that satisfied the threshold.

Various embodiments include a method. The method can be implemented via execution of computing instructions configured to run at one or more processors and configured to be stored at non-transitory computer-readable media. The method can comprise receiving historical in-session user activity information; receiving, via a graphical user interface (GUI) of a user device, a partial search query from a user; analyzing the partial search query based on the historical in-session user activity information using one or more query suggestion systems to determine a respective score for respective suggested search queries from each of the one or more query suggestion systems; determining a respective absolute position metric for the respective suggested search queries from each of the one or more query suggestion systems, wherein the respective absolute position metric is based on a respective score for the respective suggested search queries; determining a respective efficiency metric for each of the one or more query suggestion systems based on the respective absolute position metric; analyzing the respective efficiency metric for each of the one or more query suggestion systems to determine a query suggestion system of the one or more query suggestion systems that satisfies a threshold; and transmitting instructions to modify the GUI to display the respective suggested search queries from the query suggestion system that satisfied the threshold.

In other embodiments, a system includes one or more processors; and one or more non-transitory computer-readable media storing computing instructions. The computer instructions, when executed on the one or more processors, perform, coordinating at a first system in an online mode: analyzing at least a portion of a search query using one or more query suggestion systems to determine scores for suggested search queries from the one or more query suggestion systems. The computer instructions, when executed on the one or more processors, further perform, coordinating at a second system in the online mode: determining position metrics for the suggested search queries, wherein the position metrics are based on the scores for the suggested search queries; determining efficiency metrics for the one or more query suggestion systems based on the position metrics for the one or more query suggestion systems; analyzing the efficiency metrics for the one or more query suggestion systems to determine a query suggestion system of the one or more query suggestion systems that satisfies a threshold; and transmitting instructions to modify a graphical user interface (GUI) of a user device to display, to a user, one or more suggested search queries from the query suggestion system that is determined to satisfy the threshold.

In further embodiments, a method is implemented via execution of computing instructions configured to run at one or more processors and configured to be stored at non-transitory computer-readable media. The method includes coordinating at a first system in an online mode: analyzing at least a portion of a search query using one or more query suggestion systems to determine scores for suggested search queries from the one or more query suggestion systems. The method also includes coordinating at a second system in the online mode: determining position metrics for the suggested search queries, wherein the position metrics are based on the scores for the suggested search queries; determining efficiency metrics for the one or more query suggestion systems based on the position metrics for the one or more query suggestion systems; analyzing the efficiency metrics for the one or more query suggestion systems to determine a query suggestion system of the one or more query suggestion systems that satisfies a threshold; and transmitting instructions to modify a graphical user interface (GUI) of a user device to display, to a user, one or more suggested search queries from the query suggestion system that is determined to satisfy the threshold.

Figure 2:
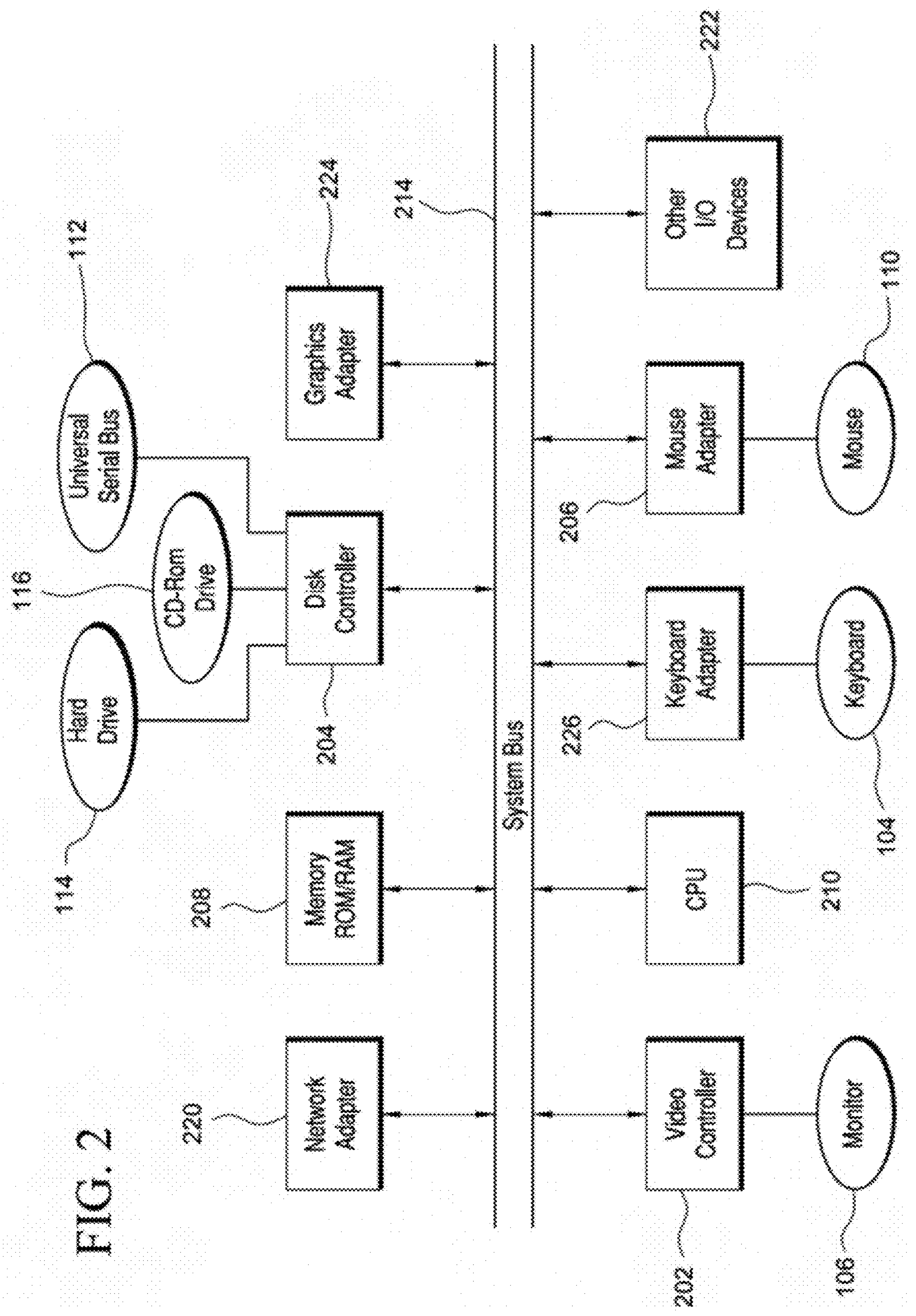
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, “processor” and/or “processing module” means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2).

At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
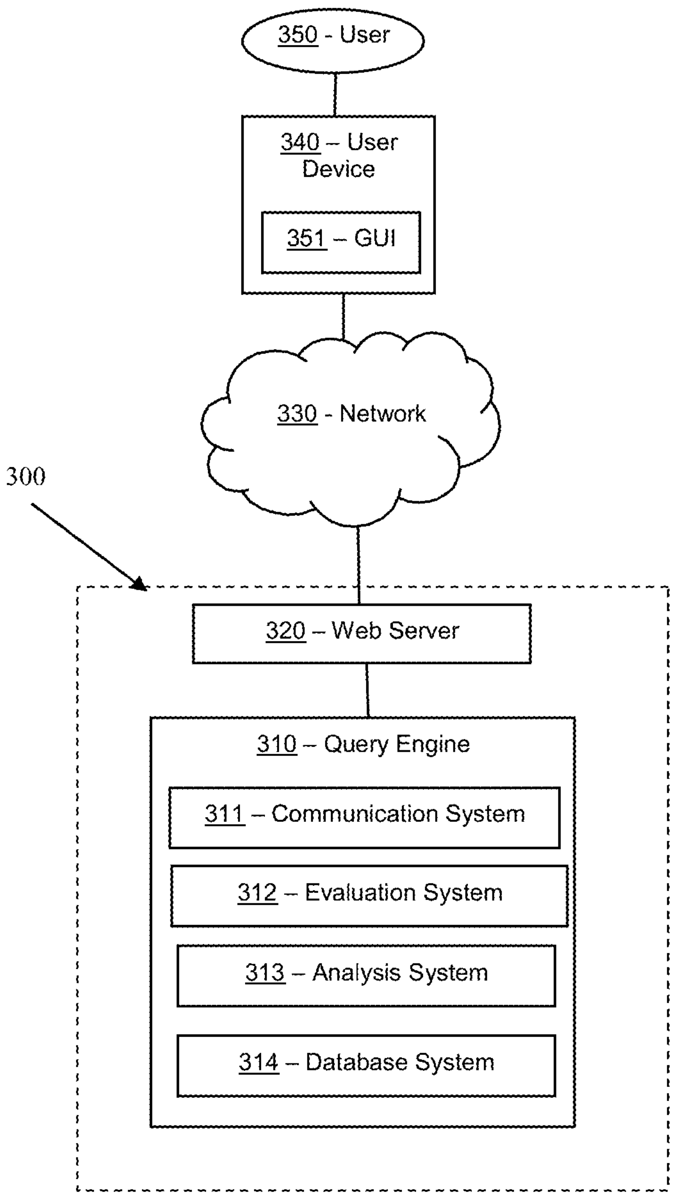
FIG. 3 illustrates a representative block diagram of a system, according to an embodiment.

Turning ahead in the drawings, FIG. 3 illustrates a block diagram of a system 300 that can be employed for determining and analyzing query suggestions and one or more query suggestion systems, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a query engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Query engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host query engine 310 and/or web server 320. Additional details regarding query engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with infrastructure components in an IT environment, in addition to other suitable activities. In a number of embodiments, web server 320 can interface with query engine 310 when a user (e.g., 350) is viewing infrastructure components in order to assist with the analysis of the infrastructure components.

In some embodiments, an internal network that is not open to the public can be used for communications between query engine 310 and web server 320 within system 300. Accordingly, in some embodiments, query engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, query engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to query engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of query engine 310 and/or web server 320. In a similar manner, the processors and/or the non-transitory computer-readable media can be local and/or remote to each other.

Meanwhile, in many embodiments, query engine 310 and/or web server 320 also can be configured to communicate with one or more databases, such as a database system 314. The one or more databases can include query suggestion information, user activity information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, query engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, query engine 310 can include a communication system 311, an evaluation system 312, an analysis system 313, and/or database system 314. In many embodiments, the systems of query engine 310 can be modules of computing instructions (e.g., software modules) stored at non-transitory computer readable media that operate on one or more processors. In other embodiments, the systems of query engine 310 can be implemented in hardware. Query engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host query engine 310 and/or web server 320. Additional details regarding query engine 310 and the components thereof are described herein.

In many embodiments, user device 340 can comprise graphical user interface ("GUI") 351. In the same or different embodiments, GUI 351 can be part of and/or displayed by user computer 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user computers 340. In the same or different embodiments, GUI 351 can comprise a website accessed through internet 320. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through network (e.g., Internet) 330 with user computers (e.g., 340). In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, query engine 310, and/or web server 320 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of query engine 310, and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of query engine 310, and/or web server 320. In a similar manner, the processing module(s) and the memory storage module(s) can be local and/or remote to each other.

In many embodiments, query engine 310, and/or web server 320 can be configured to communicate with one or more user computers 340. In some embodiments, user computers 340 also can be referred to as customer computers. In some embodiments, query engine 310, and/or web server 320 can communicate or interface (e.g., interact) with one or more customer computers (such as user computers 340) through a network or internet 330. Internet 330 can be an intranet that is not open to the public. In further embodiments, Internet 330 can be a mesh network of individual systems. Accordingly, in many embodiments, query engine 310, and/or web server 320 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Figure 4:
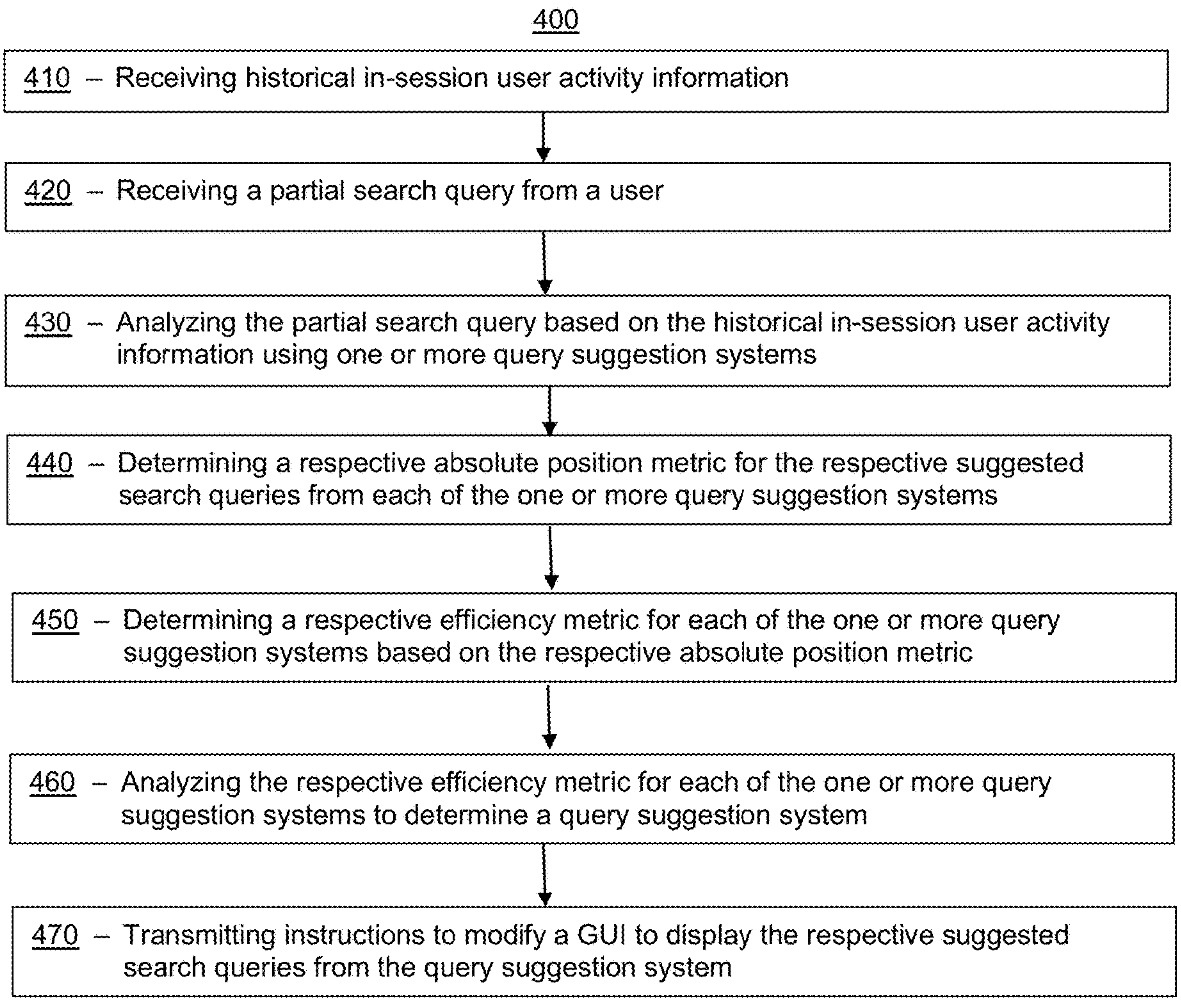
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as query engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving historical in-session user activity information. In some embodiments, the historical in-session user activity information comprises at least one or more of: (i) add-to-cart (ATC) history information for the user and prior users, (ii) previous queries for the user, or (iii) affinity information for the user. In embodiments disclosed herein, the ATC information corresponds to which products were added to cart during a user query. For example, one or more users may search for "milk" and add milk products to their cart. The previous queries for the user correspond to one or more previous queries for the current user. For example, during a current session, the user may have entered queries for "milk," "computer," and "medicine." The user affinity information corresponds to user purchase information. For example, a user may have 10 purchases and 9 of the purchases are in a "Food" category. As such, embodiments disclosed herein determine that the user has an affinity for "Food" products.

In many embodiments, method 400 can comprise an activity 420 of receiving a partial search query from a user. In some embodiments, the method can comprise receiving, via a graphical user interface (GUI) of a user device, a partial search query from a user. For example, during a current user session, a user may enter "m" as a partial search query. In some embodiments, the partial search query is a prefix. Turning briefly to FIG. 6, a data relationship 600 is illustrated. In the illustrated embodiment of FIG. 6, the data relationship comprises prefix 602 and suggestions 604. The prefix 602 corresponds to partial search queries that have been entered by a user, and the suggestions 604 correspond to one or more query suggestions output by one or more query suggestion systems, as discussed in more detail below.

Returning to FIG. 4, the method 400 can comprise an activity 430 of analyzing the partial search query based on the historical in-session user activity information using one or more query suggestion systems. In some embodiments, analyzing the partial search query based on the historical in-session user activity information using one or more query suggestion systems can comprise determining a respective score for respective suggested search queries from each of the one or more query suggestion systems. In some embodiments, analyzing the partial search query based on the historical in-session user activity information using the one or more query suggestion systems to determine the respective scores for the respective suggested search queries from each of the one or more query suggestion systems can comprise: (i) converting the ATC history information for the user and the prior users to a first numerical value, (ii) converting the previous queries for the user to a first binary value, and (iii) converting the affinity information for the user to a second binary value.

In some embodiments, converting the ATC history information for the user and the prior users to the first numerical value comprises determining a ratio between a minimum baseline score of the ATC history information and a maximum baseline score of the ATC history information. In some embodiments, the first numerical value may be determined using the following equation: (log(baseline_score)−min_bs_score)/(max_bs_score−min_bs_score). Both max_bs_score and min_bs_score are obtained from training data.

In some embodiments, converting the previous queries for the user to the first binary value comprises obtaining the category information of the current query from the category file. In some embodiments, each query can have 3 categories: curr_category_set={cat1, cat2, cat3}. In some embodiments, the method also obtains category information of previous queries from the index file. In some embodiments, each previous query can have 1 category: prev_category_set={cat1}. The first binary value is determined by identifying an intersection of the two category sets. If there is overlapping of the intersection, then a binary value of 1, if there is no overlap then a binary value of 0.

In some embodiments, converting the affinity information for the user to the second binary value further comprises determining one or more categories corresponding to each of the previous purchases of the user, and determining an affinity probability for each of the one or more categories. For example, the method obtains the affinity file on user level based on a unique identifier of the user. For the queries for this unique identifier, a determination can be made that this user has a 90% probability (e.g., affinity) of a “Food” category (e.g., 9 out of 10 queries are in “Food” category, 9 out of 10 purchases are in “Food” category, etc.). In some embodiments, the second binary value is determined by identifying the category of the current query, and if the current query belongs to “Food” category, then a binary value of 1, if the category of the current query is not “Food” then a binary value of 0.

In many embodiments, method 400 can comprise an activity 440 of determining a respective absolute position metric for the respective suggested search queries from each of the one or more query suggestion systems. In some embodiments, the respective absolute position metric is based on a respective score for the respective suggested search queries.

In some embodiments, determining the respective scores for the respective suggested search queries from each of the one or more query suggestion systems comprises using an equation comprising:

$$\text{score} = 1/(1 + e^{**}[-(x1^{*}w1 + x2^{*}w2 + x3^{*}w3 + b1)])$$

wherein w1 comprises a first weight, w2 comprises a second weight, and w3 comprises a third weight, x1 comprises the first numerical value, x2 comprises the first binary value, x3 comprises the second binary value, and b1 comprises an intercept term. In some embodiments, the weights are obtained from a trained linear regression model.

In some embodiments, determining the respective absolute position metric for the respective suggested search queries from each of the one or more query suggestion systems comprises using an equation comprising:

$$pos_{abs} = (len(\text{prefix}) - 1) \times num_{suggestions} + \text{ranking}_{query}$$

In some embodiments, prefix comprises a number of characters of the partial search query. For example, prefix corresponds to the prefix 602 of FIG. 6. In some embodiments, a user may enter “m” and select one of the suggested queries resulting in a prefix of 1. In some embodiments, $num_{suggestions}$ comprises a number of suggested queries that were previously presented to the user. For example, 8 suggested queries may be presented to the user resulting in a $num_{suggestions}$ of 8. In some embodiments, a user may not select a query from the 8 suggested queries and may type another letter in the partial query resulting in another 8 suggested queries being presented to the user, resulting in a $num_{suggestions}$ of 16. In some embodiments, ranking query comprises a number of ranked queries that were previously presented to the user. For example, if the user selected a suggested query from the first list of suggested queries, the resulting ranking query would be 1. If the user entered additional characters in their query, the system would present another 8 suggested queries increasing the $\text{ranking}_{query}$ to 2 or 3, etc. Turning briefly to FIG. 6, calculating the absolute position metric for prefix 606 would result in the following equation:

$$pos_{\text{the little mermaid clothes}} = (len(4) - 1) \times 8 + 1 = 25$$

In many embodiments, method 400 can comprise an activity 450 of determining a respective efficiency metric for each of the one or more query suggestion systems based on the respective absolute position metric. In some embodiments, determining the respective efficiency metric for each of the one or more query suggestion systems based on the respective absolute position metric comprises using an equation comprising:

$$MRR = \frac{1}{N}\sum_{i=1}^{N}\frac{1}{r_i}$$

wherein N comprises a sample of queries, and ri comprises the respective absolute position metric. In some embodiments, the efficiency metric is determined using an equation comprising:

$$ARR = \frac{1}{(Lp_{refix} - 1)L_{sugg} + r_{anki}}$$

In some embodiments, $Lp_{refix}$ corresponds to the length of the prefix when a correct query suggestion appears (e.g., is selected), and $L_{sugg}$ corresponds to the number of suggestions shown to the user, and ranki corresponds to the position of the query suggestion selected by the user.

In many embodiments, method 400 can comprise an activity 460 of analyzing the respective efficiency metric for each of the one or more query suggestion systems to determine a query suggestion system. In some embodiments, analyzing the respective efficiency metric for each of the one or more query suggestion systems to determine a query suggestion system of the one or more query suggestion systems comprises determining which of the one or more query suggestion systems satisfies a threshold. In some embodiments, analyzing the respective efficiency metric for each of the one or more query suggestion systems to determine the query suggestion system that satisfies the threshold comprises selecting a query suggestion system that has a largest efficiency metric value compared to others of the one or more query suggestion systems for the partial search query.

In many embodiments, method 400 can comprise an activity 470 of transmitting instructions to modify a GUI to display the respective suggested search queries from the query suggestion system. In some embodiments, the method can comprise transmitting instructions to modify the GUI to display the respective suggested search queries from the query suggestion system that satisfied the threshold. In some embodiments, transmitting the instructions to modify the GUI to display the respective suggested search queries from the query suggestion system that satisfied the threshold comprises (i) displaying a first numerical value of the respective suggested search queries that are output from the query suggestion system, and (ii) displaying a second numerical value of the respective suggested search queries that are output by the query suggestion system in response to receiving, via the GUI of the user device, a modification of the partial search query from the user. For example, a user may input a partial search query of "m" and the query suggestion system outputs a first number of ranked suggested queries. In some embodiments, the user does not select any of the first number of suggested search queries, and the user modifies the partial search query to "mi." In some embodiments, the method can output a second number of suggested queries based on the modified partial query.

Figure 5:
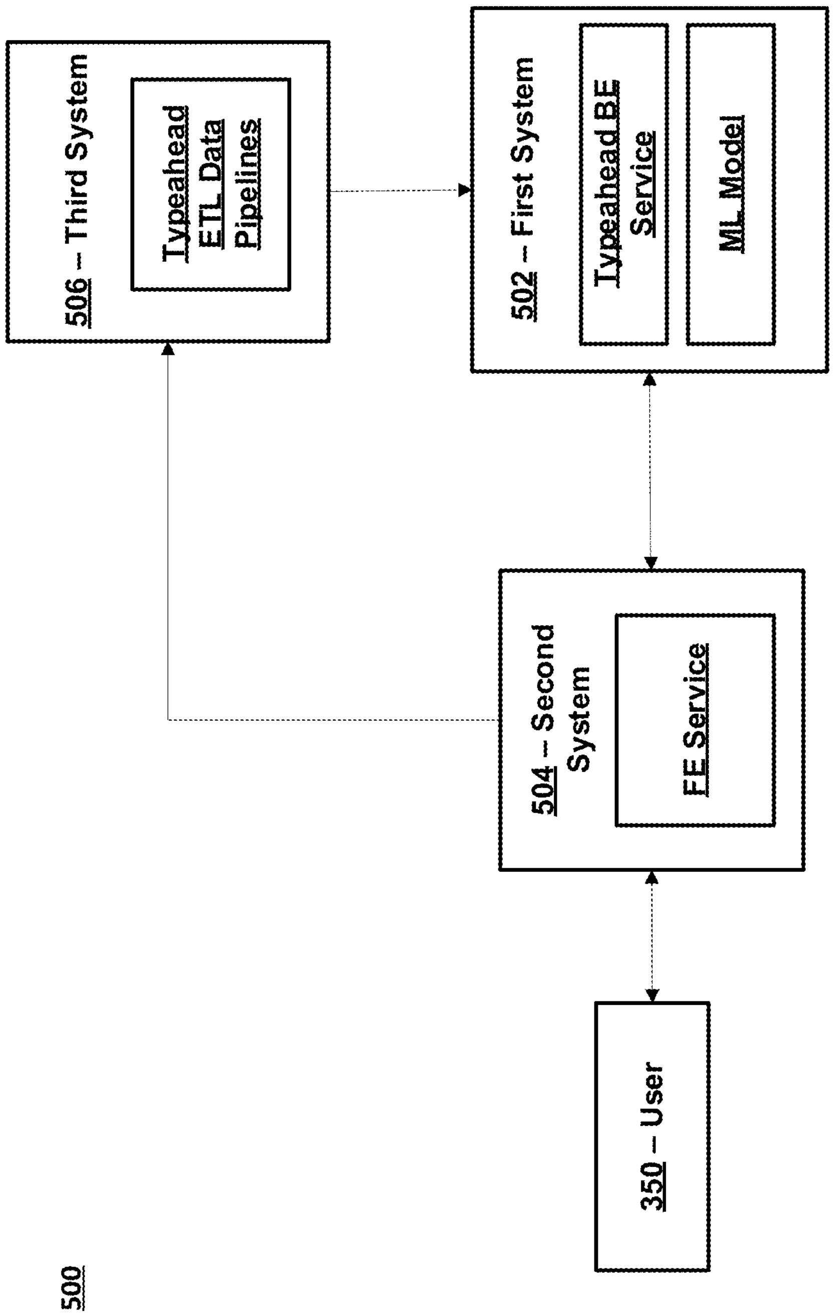
FIG. 5 illustrates an exemplary system architecture, according to certain embodiments.

Turning to FIG. 5, an exemplary system architecture 500 is illustrated. In certain embodiments, the system architecture 500 can be utilized with embodiments disclosed herein. In some embodiments, the system architecture 500 can be utilized with method 400 (FIG. 4). In the illustrated embodiment, the system architecture 500 comprises a first system 502, a second system 504, and a third system 506. In some embodiments, the first system 502 comprises a typeahead back-end (BE) service and a machine learning (ML) model, the second system 504 comprises a front end (FE) service, and the third system 506 comprises a typeahead extract, transform, and load (ETL) data pipeline.

In the illustrated embodiment, a user enters a partial search query (e.g., a prefix) into the GUI of the second system 504. For example, a user enters a partial query of "m." The second system 504 receives the partial search query from the user and transmits FE logs, analytics events, customer interactions, ATC, etc. to the third system 506. The second system 504 also transmits the partial search query from the user, previous queries of the user, and a user identifier to the first system 502.

The third system 506 transmits the baseline scores to the first system 502. For example, the third system 506 computes and transmits the first numerical value (e.g., converted ATC history information) to the first system 502.

The first system 502 computes the first binary value and second binary value, as discussed above in connection with the method 400. The first system 502 comprises a machine learning based re-ranking model that is trained based on the method 400. In some embodiments, the machine-learning model obtains the first numerical value, the first binary value, and the second binary value and outputs re-ranked query suggestions in accordance with method 400. The first system 502 transmits the query suggestions to the second system 504 and the second system 504 modifies the GUI to display the query suggestions to the user.

Returning to FIG. 3, in several embodiments, communication system 311 can at least partially perform activity 410 (FIG. 4), and/or activity 420 (FIG. 4).

In several embodiments, evaluation system 312 can at least partially perform activity 430 (FIG. 4), and/or activity 440 (FIG. 4).

In a number of embodiments, analysis system 313 can at least partially perform activity 450 (FIG. 4), and/or activity 460 (FIG. 4), and/or activity 470 (FIG. 4).

In a number of embodiments, web server 320 can at least partially perform method 400.

In many embodiments, the techniques described herein can provide a practical application and several technological improvements. In some embodiments, the techniques described herein can provide for the operation of query engine analysis and coordinating the operation amongst different computing systems.

In many embodiments, the techniques described herein can be used continuously at a scale that cannot be reasonably performed using manual techniques or the human mind. For example, processing millions of queries while a user is inputting a partial query within milliseconds cannot be feasibly completed by a human In a number of embodiments, the techniques described herein can solve a technical problem that arises only within the realm of computer networks, as query suggestions do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the machine learning model cannot be performed without a computer system and/or network.

In some embodiments disclosed herein, the absolute position metric is calculated offline using historical search data to learn the popularity of queries by query frequency and engagement including add-to-cart rate and conversion rate. The absolute position metric is updated daily as to capture seasonality. For example, a partial query of "m" may result in a top query suggestion of "milk" during the year, but a partial query of "m" may result in a top query suggestion of "milkyway" during Halloween season. Accordingly, embodiments disclosed herein can utilize any time period of historical data to account for seasonality of suggested queries.

The embodiments disclosed herein improve upon previous systems by reducing computational cost. In particular, after the model training, the weights for each feature are cached in memory. Embodiments disclosed herein obtain the top candidates from the offline system and compute the weighted features to get the absolute position metric. The implementation ensures no extra latency is added. Embodiments disclosed herein yield a +18% ARR lift compared to prior methods, thereby improving query suggestion systems.

Although systems and methods for query engine analysis have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, perform:

caching, after a machine learning model is trained and in memory of the system, weights of features of the machine learning model;

coordinating, in an online mode, receiving at least a portion of a search query;

coordinating, in the online mode and using the machine learning model, determining of position metrics for suggested search queries, for the at least the portion of the search query by obtaining, from an offline system, top candidates of absolute position metrics for search queries and using the cached weights of the features of the machine learning model;

determining efficiency metrics, for one or more query suggestion systems, based on the position metrics for the suggested search queries;

and transmitting, based on the efficiency metrics, instructions to modify a graphical user interface (GUI) of a user device to display one or more suggested search queries of the suggested search queries.

2. The system of claim 1, wherein coordinating determining of the position metrics for the suggested search queries comprises analyzing the at least the portion of the search query based on historical in-session user activity information.

3. The system of claim 2, wherein at least one of:

the historical in-session user activity information comprises at least one or more of: (i) add-to-cart (ATC) history information for the user and prior users, (ii) previous queries for the user, or (iii) affinity information for the user;

analyzing the at least the portion of the search query further comprises:

converting the ATC history information for the user and the prior users to a first numerical value;

converting the previous queries for the user to a first binary value; and converting the affinity information for the user to a second binary value;

converting the ATC history information for the user and the prior users to the first numerical value further comprises determining a ratio between a minimum baseline score of the ATC history information and a maximum baseline score of the ATC history information; or converting the affinity information for the user to the second binary value further comprises:

determining one or more categories corresponding to each of the previous purchases of the user; and determining an affinity probability for each of the one or more categories.

4. The system of claim 1, wherein:

the computing instructions, when executed on the one or more processors, further perform:

receiving historical in-session user activity information; and receiving, via the GUI of the user device, the at least the portion of the search query.

5. The system of claim 2, wherein the historical in-session user activity information and the at least portion of the search query are performed by another system in the online mode.

6. The system of claim 1, wherein the position metrics, for the suggested queries, are based on at least one of (1) a number of characters of the at least the portion of the search query, (2) a number of suggested queries that were previously presented, or (3) a number of ranked queries that were previously presented the user.

7. The system of claim 1, wherein obtaining the top candidates from the offline system reduces latency of the one or more processors relative to using the online system to determine the absolute position metrics without obtaining the top candidates from the offline system.

8. The system of claim 1, wherein at least one of:

determining of the position metrics for the suggested search queries comprises using an equation comprising:

$$pos_{abs} = (len(\text{prefix}) - 1) \times num_{suggestions} + \text{ranking}_{query}$$

wherein prefix comprises a number of characters of the at least the portion of the search query, $num_{suggestions}$ comprises a number of suggested queries that were previously presented to a user, and $ranking_{query}$ comprises a number of ranked queries that were previously presented to the user; or determining the efficiency metrics comprises using an equation comprising:

$$MRR = \frac{1}{N}\sum_{i=1}^{N}\frac{1}{r_i}$$

wherein N comprises a sample of queries, and ri comprises the position metric.

9. The system of claim 1, wherein the computing instructions, when executed on the one or more processors, further perform:

selecting a query suggestion system, of one or more query suggestion systems associated with the one or more suggested search queries, that has a largest efficiency metric value of the efficiency metrics.

10. The system of claim 1, wherein transmitting the instructions to modify the GUI of the user device to display the one or more suggested search queries comprises:

displaying one or more first numerical values of the one or more suggested search queries; and displaying one or more second numerical values of one or more other suggested search queries based on receiving, via the GUI of the user device, a modification of the at least the portion of the search query.

11. A method implemented via execution of computing instructions configured to run at one or more processors and configured to be stored at non-transitory computer-readable media, the method comprising:

caching, after a machine learning model is trained and in memory, weights of features of the machine learning model;

coordinating in an online mode, receiving at least a portion of a search query;

coordinating, in the online mode and using the machine learning model, determining of position metrics for suggested search queries for the at least the portion of the search query by obtaining, from an offline system, top candidates of absolute position metrics for search queries and using the cached weights of the features of the machine learning model;

determining efficiency metrics, for one or more query suggestion systems, based on the position metrics for the suggested search queries;

and transmitting, based on the efficiency metrics, instructions to modify a graphical user interface (GUI) of a user device to display one or more suggested search queries of the suggested search queries.

12. The method of claim 11, wherein coordinating determining of the position metrics for the suggested search queries comprises analyzing the at least the portion of the search query based on historical in-session user activity information.

13. The method of claim 12, wherein at least one of:

the historical in-session user activity information comprises at least one or more of: (i) add-to-cart (ATC) history information for the user and prior users, (ii) previous queries for the user, or (iii) affinity information for the user;

analyzing the at least the portion of the search query further comprises:

converting the ATC history information for the user and the prior users to a first numerical value;

converting the previous queries for the user to a first binary value; and converting the affinity information for the user to a second binary value;

converting the ATC history information for the user and the prior users to the first numerical value further comprises determining a ratio between a minimum baseline score of the ATC history information and a maximum baseline score of the ATC history information; or converting the affinity information for the user to the second binary value further comprises:

determining one or more categories corresponding to each of the previous purchases of the user; and determining an affinity probability for each of the one or more categories.

14. The method of claim 11, further comprising:

receiving historical in-session user activity information; and receiving, via the GUI of the user device, the at least the portion of the search query.

15. The method of claim 12, wherein the historical in-session user activity information and the at least portion of the search query are received by another system in the online mode.

16. The method of claim 11, wherein the position metrics, for the suggested queries, are based on at least one of (1) a number of characters of the at least the portion of the search query, (2) a number of suggested queries that were previously presented, or (3) a number of ranked queries that were previously presented.

17. The method of claim 11, wherein obtaining, from the offline system, reduces latency of the one or more processors relative to using the online system to determine the absolute position metrics.

18. The method of claim 11, wherein at least one of:

determining of the position metrics for the suggested search queries comprises using an equation comprising:

$$pos_{abs} = (len(\text{prefix}) - 1) \times num_{suggestions} + \text{ranking}_{query}$$

wherein prefix comprises a number of characters of the at least the portion of the search query, $num_{suggestions}$ comprises a number of suggested queries that were previously presented to a user, and $ranking_{query}$ comprises a number of ranked queries that were previously presented to the user; or determining the efficiency metrics comprises using an equation comprising:

$$MRR = \frac{1}{N}\sum_{i=1}^{N}\frac{1}{r_i}$$

wherein N comprises a sample of queries, and ri comprises the position metric.

19. The method of claim 11, wherein the computing instructions, when executed on the one or more processors, further perform:

selecting a query suggestion system, of the one or more suggested search queries, that has a largest efficiency metric value of the efficiency metrics.

20. The method of claim 11, wherein transmitting the instructions to modify the GUI of the user device to display the one or more suggested search queries comprises:

displaying one or more first numerical values of the one or more suggested search queries; and displaying one or more second numerical values of one or more other suggested search queries based on receiving, via the GUI of the user device, a modification of the at least the portion of the search query.

* * * * *